3,576,915
MODIFIED INTERPOLYMER COATINGS

Paul R. Graham, Ballwin, and August F. Ottinger, St. Louis, Mo., assignors to Monsanto Company, St. Louis, Mo.
No Drawing. Filed Nov. 17, 1969, Ser. No. 877,463
Int. Cl. C08f 37/18, 41/12
U.S. Cl. 260—897
17 Claims

ABSTRACT OF THE DISCLOSURE

This invention is directed to a composition comprising a polybasic carboxylic anhydride/vinyl monomer interpolymer and an interpolymer consisting of ethylene, vinyl chloride, and optionally other ethylenically unsaturated monomers. The composition has use as a flexible tough film coating for fibrous substrates.

---

This invention relates to modified interpolymers and the use of these interpolymers as films for fibrous substrates. More particularly, this invention provides interpolymers of alpha,beta-unsaturated polybasic carboxylic acids modified with ethylene/vinyl chloride interpolymers. In addition, this invention provides that such modified interpolymers provide an excellent flexible barrier to oil, solvent, grease and water when applied to fibrous substrates.

In recent years there has been an increased demand for coated paper and paperboard displaying greater resistance to solvents, grease, wax, oil and water. Such coatings on paper are required to provide excellent solvent and toner holdout in electrofax papers. Additional requirements provide for water resistance and wax holdout for food and other packaging, grease resistant packaging and high ink holdout printing papers.

Interpolymers of alpha,beta-unsaturated polybasic carboxylic acids have been used as paper coatings. However, such interpolymers lack flexibility and toughness and tend to become permeable to solvents, oil, grease and water through breaks in the film caused by crease or score line failure and other imperfections caused by crumpling. Many attempts have been made to improve the solvent, oil, grease and water resistance of these interpolymer coatings. The use of external plasticizers has failed because of volatility, migration, incompatibility and the general lack of film integrity over a wide humidity range. Polyvinyl acetate and styrene butadiene latexes conventionally used for this purpose have been found to be incompatible. None of these approaches to provide satisfactory coatings have been successful.

In view of the state of the art, it has become highly desirable to provide interpolymers of alpha,beta-unsaturated polybasic carboxylic acids which are useful for coating fibrous substrates which provide excellent flexible barrier characteristics.

It is accordingly an object of this invention to provide new interpolymer compositions which have improved solvent, oil, grease and water resistance when applied to fibrous substrates.

Other objects and advantages of this invention will be apparent to those skilled in the art from the following detailed description and claims.

In accordance with this invention it has been found that the above and still further objects are achieved when fibrous substrates are coated with new compositions comprising interpolymers of alpha,beta-unsaturated polybasic carboxylic acids modified with ethylene/vinyl chloride interpolymers of the type hereinafter described.

The interpolymers of alpha-beta-unsaturated polybasic carboxylic acids include interpolymers of polybasic carboxylic acids or anhydrides thereof, having from 4 to about 6 carbon atoms with alpha-olefins, alkyl vinyl ethers or vinyl alkanoates.

Because of cost and availability maleic anhydride is preferred for preparing these copolymers although free maleic acid, fumaric acid, and other homologous or related di- and tricarboxylic acids such as itaconic acid, aconitic, citraconic acids or anhydrides thereof can also be used, if desired, to react with the alpha-olefin alkyl vinyl ether, or vinyl alkanoate monomer.

The alpha-olefins used to prepare these "maleic-type" interpolymers may be aliphatic alkene alpha-olefinically unsaturated hydrocarbons having from 2 to about 40 carbon atoms such as ethylene, propylene, butylene and higher alpha-olefin hydrocarbons which may be branched or straight chained, e.g., 3-methyl-1-pentene, 4-methyl-1-pentene, 1-hexene, isooctene, 1-dodecene, 1-hexadecene, 1-octadecene, 1-docosene, 1-tricontene, etc. Preferably, however, the alpha-olefin is a monocyclic aromatic hydrocarbon alpha-olefin such as styrene, vinyl toluene, vinyl xylene, chlorinated styrenes, etc. Mixtures of alpha olefins may be used if desired.

Alkyl vinyl ethers may also be used as a comonomer with maleic anhydride or one or more of its equivalents to prepare useful interpolymers for use in this invention. They may be prepared in conventional manner by treatment of an alcohol with an alkali catalyst followed by reaction with acetylene. The alcohols used can be straight or branched chained, naturally occurring or synthetic, e.g., those resulting from the "oxo" and other processes. These vinyl ethers are of the general formula $$Z\text{—}O\text{—}CH\text{=}CH_2$$

wherein Z is an alkyl group containing from 2 to about 40 carbon atoms, and preferably from about 10 to about 32 carbon atoms. Representative vinyl ethers include, for example, oxo-decyl, oxo-tridecyl, oxo-hexadecyl, oxo-nonadecyl, propyl, hexyl, n-decyl, n-dodecyl, n-octadecyl, n-tetradosyl, n-tritriacontyl, tetratriacontyl, hexatriacontyl vinyl ether. Aryl vinyl ethers, alkoxyalkyl vinyl ethers, aryloxyalkyl vinyl ethers, and alkylaryl vinyl ethers and the like such as phenyl, benzyl, tolyl, dodecylphenyl, octadecylphenyl, xylyl, dinonylphenyl, methoxyphenyl, ethoxyphenyl, dodecyloxyphenyl, octadecyloxyphenyl, phenoxyphenyl, phenoxyhexyl, phenoxyoctyl, phenoxyoctadecyl vinyl ethers could also be used to react with the maleic-type of alpha,beta-unsaturated polycarboxylic acid or anhydride to form the interpolymers used in this invention. Mixtures of alkyl vinyl ethers obtained from mixed alcohols of the type described above may also be used.

The vinyl alkanoate esters which are used as comonomers with maleic anhydride or related compounds include those having up to about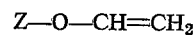 8 carbon atoms in the alkanoate moiety. Vinyl acetate, vinyl propionate, vinyl butanoate, vinyl pentanoate, vinyl hexanoate, vinyl heptanoate, vinyl octanoate and vinyl stearate may be used. Vinyl acetate is preferred. Related compounds having the polymerizable double bond in the acid moiety of the ester such as methyl methacrylate, methyl acrylate, ethyl acrylate may also be used.

The interpolymers are preferably copolymers of maleic anhydride with one other type of monomer, that is, an alpha-olefin, an alkyl vinyl ether, or a vinyl alkanoate. However, third comonomers of the same or from one of the other mentioned types could also be used to prepare three or more component interpolymers. It is preferred that the maleic anhydride be used in the molar range of from 0.9 to 1.1 moles to 1 mole of the alpha-olefin, alkyl vinyl ether, or vinyl alkanoate comonomer. The interpolymers may be used as low molecular polymers of low viscosity or have higher molecular weight materials ranging from about 1,000 to about 200,000. It is preferred to use interpolymers having specific viscosities in the range of from about 0.2 to 3.0.

In the examples herein the styrene-maleic anhydride copolymer employed is prepared in the following manner:

EXAMPLE 1

A mixture of methyl half ester of maleic acid and maleic anhydride is prepared by reacting forty-five parts of maleic anhydride and five parts of methanol. The reaction mixture is then polymerized with 50 parts of styrene. The resulting copolymer has a low residual monomer content and is soluble in aqueous solutions of alkaline materials.

EXAMPLE 2

About 80 parts of substantially dry styrene-maleic anhydride-methyl ester of maleic acid heteropolymer prepared in Example 1 is stirred vigorously with about 44 parts of a 49% sodium hydroxide solution. There is produced approximately 111 parts of the sodium salt of the heteropolymer which is a substantially dry, finely divided powder and readily soluble in water.

The ethylene/vinyl chloride interpolymers which are used as modifiers according to this invention generally contain from about 5 percent to about 70 percent ethylene, from about 30 to about 95 percent vinyl chloride, and from about 0.0 to about 10 percent of acrylamide. Part of the acrylamide in the interpolymer may be replaced by polar monomers such as acrylonitrile, N-(lower alkyl)acrylamide and N-(lower alkyl)methacrylamide containing from 1 to 3 carbon atoms in said lower-alkyl groups, N-methylol acrylamide, N[2 - (2-methyl-4-oxopentyl)]acrylamide, N-(1,1 - dimethyl-3-oxobutyl)acrylamide, acrylic acid, methacrylic acid, and alkali metal and ammonium salts of acrylic and methacrylacrylic acids, maleic acid, fumaric acid, half and complete alkali metal and ammonium salts of maleic and fumraic acid, aconitic acid, itaconic acid, citraconic acid, and alkali metal and ammonium salts thereof, acrylyl and methacrylyl esters of hydroxyalkanoic acids having from 2 to about 6 carbon atoms in the alkanoic acid moieties, acrylylamides and methacrylylamides of aminoalkanoic acids having from 2 to about 6 carbons in the aminoalkanoic acid, hydroxyethyl and hydroxypropyl esters of acrylic, methacrylic, maleic and fumaric acids, vinyl esters of alkanoic acids having from 1 to 6 carbon atoms such as vinyl acetate, vinyl propionate, and lower alkyl (1 to 6 carbon atoms) sulfonic acid, phenylsulfonic acids, and alkylphenylsulfonic acids and acrylyl and methacrylyl esters of hydroxyalkylsulfonic acids having from 1 to 6 carbon atoms in said alkyl moieties, and hydroxyalkylsulfonamides having from 1 to 6 carbon atoms in said hydroxyalkyl moieties. The acrylamide generally should constitute at least 50 percent by weight of the third or polar monomer of said interpolymer and preferably constitutes at least about 80 percent of said polar monomer.

Thus the ethylene/vinyl chloride interpolymers as prepared in aqueous dispersed form are at least copolymers containing ethylene and vinyl chloride. The interpolymers may also be terpolymers containing ethylene, vinyl chloride and acrylamide and may be a quaternary or higher polymers containing one or more of the above exemplified additional polar monomers in small quantities but generally such additional monomers will not be present in the interpolymer in quantitiies greater than about 2 percent by weight.

It is preferred that the interpolymer contain from about 5 percent to about 70 percent ethylene, 30 percent to about 95 percent vinyl chloride, and from about 1 percent to about 5 percent acrylamide. A specific example of choice, as presently understood, is a terpolymer containing from about 19 to 23 percent ethylene, about 74 to about 78 percent vinyl chloride, and from about 2 to about 4 percent acrylamide.

Although the ethylene/vinyl chloride interpolymers used as modifiers in the practice of this invention are generally unmodified, the modified ethylene/vinyl chloride interpolymers are included for use in this invention. The interpolymers are particularly amenable to hydrolytic modification by the use of small quantities of a strongly alkaline material such as an alkali metal hydroxide, or a quaternary ammonium hydroxide such as tetramethyl ammonium hydroxide, or by a strong acid such as the mineral acids, e.g., hydrochloric, sulfuric, phosphoric, nitric. The base or acid used preferably has an ionization constant higher than $10^{-4}$ at 25° C.

The hydroyzing treatment, performed with an acid or a base need not be performed to the same extent, especially if the interpolymer contains polar monomers in addition to the acrylamide. The aqueous dispersion or polymer latex of the ethylene, vinyl chloride, and acrylamide is generally treated wtih aqueous base or acid in an amount which is chemically equivalent to up to about 100 percent of the amide equivalent in the interpolymer.

Specific examples of polar monomers which may be used, as described above, to replace part of the acrylamide in the polymers of this invention include acrylonitrile, N-methacrylamide, N-ethylacrylamide, N-propylacrylamide, methacrylamide, N-(1,1 - dimethyl - 3 - oxobutyl)-acrylamide, acrylic, methacrylic, maleic, fumaric, itaconic, aconitic, and citraconic acids and alkali metal and ammonium salts of such acids, preferably the sodium, potassium or ammonium salts, alkyl esters of such acids, e.g., methyl acrylate, ethylacrylate, butyl acrylate, methyl methacrylate, butyl methacrylate, ethyl methacrylate, monoethyl maleate, dipropyl fumarate, acrylyl 3 - hydroxypropionate,, methacrylyl 4 - hydroxybutanoate, N-acrylyl acetamide, N-methacrylyl hexamide, 2 - hydroxyethyl and 2-hydroxypropyl esters of acrylic, methacrylic, maleic, fumaric, itaconic, aconitic, and citraconic acids, vinyl formate, vinyl acetate, vinyl hexanoate, vinyl and alkyl esters of propanesulfonic acid, vinyl phenylsulfonate, acrylyl and methacrylyl esters of 2-hydroxypropylsulfonic acid, and N-acrylyl and N-methacrylyl 2-hydroxypropanamides.

The foregoing ethylene-vinyl chloride interpolymers are readily prepared by various means known to the art. The ethylene/vinyl chloride copolymers used in this invention are preferably prepared by a process which comprises mixing the ethylene and vinyl chloride monomers in the presence of an alkaline buffered redox initiator-catalyst system, water and from about 1% to about 8% by weight based on the monomer feed, and from about 4% to about 7% by weight based upon the polymer product, of a nonionic emulsfying agent having a HLB value (hydrophilic-lipophilic balance of an emulsifier) of from about 10 to about 17, and reacting the mixture at a temperature and pressure and for a time sufficient to cause polymerization of the monomers. Other suitable emulsifying agents include anionic emulsifiers having a HLB value of at least 10.

The ethylene, vinyl chloride, acrylamide interpolymers may be prepared by first mixing ethylene and vinyl chloride in an aqueous medium in the presence of any suitable anionic or nonionic emulsifier and any initiator capable of generating free radicals in the chemical mixture at the chosen reaction temperature and pressure. The acrylamide, preferably in aqueous solution either alone or mixed with the appropriate amounts of other polar monomers, is added to the polymerizing ethylene and vinyl chloride mixture gradually throughout the reaction. The addition of the acrylamide is preferably begun after about 40 to 50 percent of the desired conversion of the ethylene and vinyl chloride has been reached. A shell-core latex in which the polar monomer is concentrated in the outer layers is produced.

Examples of the ethylene/vinyl chloride interpolymer latices which can be used in the practice of this invention are shown in Table I.

TABLE I

| Polymer Example No. | Hydrolyzed | VCl, percent | Ethylene, percent | Acrylamide, percent | Sodium acrylate, percent | Sodium methacrylate, percent | Latex percent polymer solids | Percent SLS |
|---|---|---|---|---|---|---|---|---|
| 3 | No | 76 | 21 | 3 | | | 47.0 | 1.5 |
| 4 | No | 74.9 | 25 | 0.50 | | | 47.3 | 0.9 |
| 5 | No | 70.5 | 27 | 2.36 | | | 45.7 | 1.79 |
| 6 | No | 74.0 | 25 | 1.48 | | | 48.1 | 1.40 |
| 7 | No | 72.2 | 27 | 0.65 | | | 47.7 | 2.06 |
| 8 | No | 72 | 18 | 3.0 | | | | |
| 9 | Yes | 76 | 21 | 3 | | | 49.0 | |
| 10 | Yes | 74.9 | 25 | 0.5 | | | 46.1 | |
| 11 | Yes | 70.5 | 27 | 2.36 | | | 44.2 | |
| 12 | Yes | 74.0 | 25 | 1.48 | | | 46.9 | |
| 13 | No | 76 | 21 | 2.3 | 0.7 | | 43 | 1.1 |
| 14 | No | 76 | 21 | 2.3 | | 0.7 | 43 | 1.1 |
| 15 | No | 70 | 30 | | | | 44 | |
| 16 | No | 74.8 | 25.2 | | | | 51.3 | |
| 17 | No | 70.5 | 29.5 | | | | 44.8 | |
| 18 | No | 76 | 24 | | | | 45.2 | |

Illustrative of other ethylene/vinyl chloride interpolymers which may also be employed in the compositions of this invention are ethylene/vinylchloride/acrylamide hydroxyethylacrylate, ethylene/vinyl chloride/acrylamide/N-isopropylacrylamide, ethylene/vinyl chloride/acrylamide/N-ethylmethacrylamide, ethylene/vinyl chloride/acrylamide/diammonium itaconate, ethylene/vinyl chloride/acrylamide/monobutyl acid maleate and ethylene/vinyl chloride/acrylamide/N-methacrylylpropionamide.

The modified interpolymers are prepared in accordance with the present invention by mixing the polycarboxylic acid interpolymer with an ethylene/vinyl chloride interpolymer heretofore described. The ethylene/vinyl chloride interpolymer can constitute from about 0.1% to about 20% by weight of the polybasic carboxylic acid interpolymer. It is preferred, however, to employ compositions containing between about 1% to about 15% of the ethylene/vinyl chloride interpolymer.

The ethylene/vinyl chloride interpolymer is generally blended with the polybasic carboxylic acid interpolymer after the polybasic carboxylic acid interpolymer has been cooked. For example, the polybasic carboxylic acid interpolymer-water mixture is cooked with agitation at about 90–95° C. for approximately 15 minutes, then cooled to about 65–70° C. The ethylene/vinyl chloride interpolymer latex is then added to the cooked interpolymer solution to provide a total solids content of the polybasic carboxylic acid interpolymer-ethylene/vinyl chloride interpolymer blend of from 1% to about 25%. A preferred total solids content of the blend ranges from about 5% to about 15%. The cooling is carried out only for laboratory control. In commercial practice, solutions may be applied over a wide temperature range normally practiced in the paper manufacturing industry.

The modified interpolymers are applied to the fibrous substrates as aqueous dispersions. The concentrations of the compositions will, of course, vary with differing polycarboxylic acid interpolymers, base stocks, product specifications and other factors.

The fibrous substrates such as paper which may be coated according to this invention with the modified interpolymers to produce a product of enhanced barrier characteristics may contain from about 0.5 to about 150 pounds of modified interpolymer composition on one side per ream. (A ream is 3000 sq. ft. and equals 500 sheets, 24 inches by 36 inches.) Generally, however, about 1 to 20 pounds of modified interpolymer composition is adequate while 1 to 5 pounds is all that is required for many purposes.

The fibrous substrates to which the compositions are applied in carrying out the present invention include papers of all types, such as bond writing paper, fibrous paperboards such as cardboard, chipboard, carton stock, glassine, parchment and the like, wrapping papers or boards, or liners for containers intended for the packaging of foods, greases, chewing gum, soap, soap powders, cosmetics, calking compounds, etc. The coated papers may also be used as wallpapers, papers for lining drawers and shelves, especially in linen closets, kitchen cabinets and the like, and the coated paper or paperboards may be used as bookcovers or book pages. The compositions may be applied to provide solvent and toner holdout in electrofax paper and high ink holdout in printing paper.

The processes for applying the interpolymer coating to the fibrous substrate are well known in the art. Such techniques include spraying, roller coating, air-knife coating, trailing blade coating, curtain coater, and use of a Mayer rod (machine). The compositions can also be used in size press and calendar applications.

The coatings are then tested for various physical properties. The test procedures are hereinafter described and the results are listed in Tables II, III and IV.

The test methods used to determine the physical properties of the firous substrate coated with the modified starch compositions are listed below along with explanatory notes where necessary. Samples were conditioned according to TAPPI T402m-49 before testing. The paper base stock used in the testing hereinafter described is 50 lb. bleached Kraft.

Oil resistance—creased box test—a 6″ x 6″ coated one side specimen blank is folded diagonally from corner to corner, each fold is subjected to a 5 lb. pressure. The blank is further folded one inch from each edge and then made up into a 4″ x 4″ box having 1″ side walls with the coated surface inside. All creases, except those made by the side wall folds converge as an apex in the center of the box bottom. 50 cc. No. 10 SAE oil is poured into the box and the time required to penetrate the creased areas is noted.

Solvent holdout—a coated paper is placed on a glass plate with the coated side up. A brass or glass tube 2″ high and having a 1⅛″ I.D. is placed in an upright position on the paper. One ml. of dyed toluene solution is poured into the tube and the stop watch is started. After 10 seconds the tube is slid off of the paper and the excess toluene removed. The number of penetrations are noted. Other solvents such as the Smith Corona Marchant (S.C.M.) microstatic dispersant (distillation range—1st drop 182.5° C. to dry point 211.4° C.) may be used in place of toluene.

Ink penetration—the test sheet is floated on a standard ink bath having a pH of 1.5 and observed for the appearance of an even ink coloration on the upper observed surface. The time is measured in seconds. TAPPI Routine Control Method RC-14.

TABLE II.—COATING COMPOSITION PROPERTIES AND FILM CHARACTERISTICS

| Composition of | Components Polymer Example | Plastifier | Total solids, percent | Percent plastifier | pH | Viscosity at 25° C., cps. | Film properties |
|---|---|---|---|---|---|---|---|
| A | 2 | None | 10 | | 7.40 | 87.0 | Clear, brittle. |
|   | 2 | do | 10 | | 7.95 | 46.0 | Clear, light yellow, brittle. |
| B | 2 | Styrene butadiene [1] | 12 | 20 | | | Incompatible. |
| C | 2 | Polyvinylacetate [2] | 12 | 20 | | | Do. |
| D | 2 | E/VCl interpolymer [3] | 12 | 20 | 7.89 | 63.8 | Clear, light yellow, flexible. |
| E | 2 | E/VCl interpolymer [4] | 10 | 10 | 7.65 | 82.0 | |
|   |   |   | 10 | 20 | 7.55 | 77.2 | |
|   |   |   | 10 | 30 | 7.55 | 72.5 | |
| F | 2 | E/VCl interpolymer [5] | 10 | 10 | 8.00 | 61.0 | |
|   |   |   | 10 | 20 | 8.05 | 59.0 | |
|   |   |   | 10 | 30 | 8.10 | 57.5 | |
| G | 2 | E/VCl interpolymer [6] | 10 | 10 | 7.51 | 81.0 | |
|   |   |   | 10 | 20 | 7.53 | 78.0 | |
|   |   |   | 10 | 30 | 7.55 | 75.0 | |
| H | 2 | E/VCl interpolymer [7] | 10 | 10 | 8.00 | 62.0 | |
|   |   |   | 10 | 20 | 8.10 | 59.0 | |
|   |   |   | 10 | 30 | 8.10 | 58.0 | |

[1] Dow 620.
[2] Monsanto Co. 3-840-N.
[3] Interpolymer of Example 3.
[4] Interpolymer of Example 3.
[5] Interpolymer of Example 9.
[6] Interpolymer of Example 8.
[7] Interpolymer of Example 18.

TABLE III.—SOLVENT HOLDOUT PROPERTIES

| Composition | Percent plastifier | Coating wt. lb./3,000 ft.[2] | Toluene No. of pinholes/1⅛" area in 10 sec. | S.C.M. Microstatic dispersant No. of pinholes/1⅛" area in 10 sec. |
|---|---|---|---|---|
| A | None | 3.30 | 10-15-13-18-17 | 6-7-11-9-10 |
|   | None | 4.6 | 8-7-10-8-10 | 8-10-6-7-6 |
| D | 20 | 5.0 | 1-0-1-0-0 | 2-1-0-1-0 |
| E | 10 | 3.52 | 10-9-8-11-0 | 5-5-4-3-5 |
|   | 20 | 3.60 | 6-5-6-7-6 | 2-3-4-3-2 |
|   | 30 | 3.54 | 2-3-4-4-4 | 1-1-1-2-1 |
| F | 10 | 3.40 |  | 7-9-8-9-9 |
|   | 20 | 3.42 |  | 5-6-6-5-6 |
|   | 30 | 3.47 |  | 3-5-6-4-7 |
| G | 10 | 3.60 | 11-11-14-13-10 | 5-6-6-5-5 |
|   | 20 | 3.18 | 7-6-4-7-8 | 2-3-3-3-2 |
|   | 30 | 4.05 | 1-3-3-2-5 | 1-1-0-1-1 |
| H | 10 | 3.09 | 10-8-7-6-11 | 6-7-5-7-6 |
|   | 20 | 3.76 | 6-5-5-6-7 | 2-3-5-3-3 |
|   | 30 | 3.66 | 1-3-4-3-3 | 1-1-0-1-0 |

Note.—All coatings, Tables III and IV, Double Coat, One Side, No. 40 rod and calendered.

TABLE IV.—OIL AND INK RESISTANCE PENETRATION PROPERTIES

| Composition | Percent plastifier | Coating wt., lb./3,000 ft.[2] | Ink penetration—seconds to penetrate | Oil Resistance Penetration time, sec. | Type of failure |
|---|---|---|---|---|---|
| A | None | 4.6 |  | 27 | Along creases with some penetration in uncreased areas. |
|   | None | 3.30 | 163 | 13.5 | Along creases with considerable penetration in uncreased areas. |
| D | 20 | 5.0 |  | 58.0 | Along creases only. Uncreased areas remain clear. |
| E | 10 | 3.52 | 142 | 12.4 | Along creases with considerable penetration in uncreased areas. |
|   | 20 | 3.60 | 132 | 14.8 | Along creases with some penetrations in uncreased areas. |
|   | 30 | 3.54 | 129 | 40.3 | Along creases with few penetrations in uncreased areas. |
| Fg | 10 | 3.40 | 88 |  | Along creases with considerable penetration in uncreased areas. |
|   | 20 | 3.42 | 72 |  | Do. |
|   | 30 | 3.47 | 65 |  | Along creases with some penetration in uncreased areas. |
| G | 10 | 3.60 | 138 | 13.2 | Do. |
|   | 20 | 3.18 | 126 | 14.6 | Do. |
|   | 30 | 4.05 | 118 | 45.4 | Along creases with few penetrations in uncreased areas. |
| H | 10 | 3.90 | 142 | 13.5 | Along creases with some penetration in uncreased areas. |
|   | 20 | 3.76 | 131 | 14.4 | Do. |
|   | 30 | 3.66 | 121 | 42.9 | Along creases with few penetrations in uncreased areas. |

The results set forth in Tables II, III and IV show compositions D through H impart to fibrous substrates the desirable solvent, oil and ink resistance.

While this invention has been described with respect to certain embodiments, it is not so limited and it is understood that variations and modifications thereof may be made without departing from the spirit or scope of this invention.

The embodiments of the invention in which an exclusive property or privilege is claimed are defined as follows:

1. A composition comprising a sodium salt of a heteropolymer of styrene, maleic anhydride and a minor proportion based in said maleic anhydride of a methyl half ester of maleic acid and between about 0.1 and about 20% based on the weight of the heteropolymer of an interpolymer selected from the group consisting of (a) an interpolymer containing from about 5 to 70 percent ethylene, from about 30 to about 95 percent vinyl chloride, and from about 0.0 to about 10 percent of at least one other polar monomer including at least about 0.1 percent to about 10 percent of acrylamide, any remainder of said polar monomer content being selected from the group consisting of acrylonitrile, N-(alkyl)acrylamide, having from 1 to 3 carbon atoms in said alkyl groups, methacrylamide, N-(alkyl)methacrylamide, having from 1 to 3 carbon atoms in said alkyl groups, N-methylol acrylamide, N[2-(2-methyl-4-oxopentyl)]acrylamide, N-(1,1-dimethyl-3-oxobutyl)acrylamide, acrylic acid, methacrylic acid and alkali metal and ammonium salts of acrylic and methacrylic acid, maleic and fumaric acids, itaconic and citraconic acids, half alkyl esters of maleic, fumaric, itaconic, and citraconic acids having from 1 to 6 carbon atoms in said alkyl groups, acylyl and methacrylyl esters of hydroxyalkanoic acids having from 2 to 6 carbon atoms in said alkanoic acids, acrylylamide and methacrylylamides of aminoalkanoic acids having from 2 to 6 carbon atoms in said aminoalkanoic acid, hydroxyethyl and hydroxypropyl esters of acrylic, methacrylic, maleic, and fumaric acids, vinyl esters of alkanoic acids having from 1 to 6 carbon atoms and alkyl sulfonic acid having from 1 to 6 carbon atoms, phenylsulfonic acids, and acrylyl and methacrylyl esters of hydroxyalkylsulfonic acid having from 1 to 6 carbon atoms in said alkyl moieties, and hydroxyalkylsulfonamides, having from 1 to 6 carbon atoms in said hydroxyalkyl moieties; and (b) interpolymers of the type described in (a) treated with an acid or a base having an ionization constant higher than about $10^{-4}$ in amounts equivated to up to about 100 percent of the amide content of said interpolymer.

2. A composition as described in claim 1 wherein the interpolymer is present in amounts of from about 1.0% to about 15% based on the weight of the heteropolymer.

3. A composition as described in claim 1 wherein the interpolymer is a terpolymer containing from about 15 to 70 percent ethylene, from about 30 to 85 percent vinyl chloride and from about 0.1 to 10 percent acrylamide.

4. A composition as described in claim 2 wherein the ethylene/vinyl chloride/acrylamide terpolymer is treated with alkaline material chemically equivalent to up to about 100 percent of the amide content of the interpolymer.

5. A composition as described in claim 1 wherein the polar monomer content of said interpolymer is a mixture of a major amount of acrylamide and a minor amount, under 2 percent of the total interpolymer weight, of an alkali metal acrylate or methacrylate.

6. A composition as described in claim 5 wherein the interpolymer is a quaternary polymer containing from about 15 to 70 percent ethylene, from about 30 to about 85 percent vinyl chloride, from about 1 percent to about 5 percent of acrylamide, and from about 0.1 to 2 percent of sodium acrylate or methacrylate.

7. A composition as described in claim 1 wherein the interpolymer is an ethylene/vinyl chloride copolymer containing from about 55 to about 85% by weight of polymerized vinyl chloride.

8. A fibrous substrate coated with a composition comprising a sodium salt of heteropolymer of styrene, maleic anhydride and a minor proportion, based on said maleic anhydride, of a methyl half ester of maleic acid and an interpolymer selected from the group consisting of (a) an interpolymer containing from about 5 to 70 percent ethylene, from about 30 to about 95 percent vinyl chloride, and from about 0.1 to about 10 percent of at least one other polar monomer including at least about 0.1 percent to about 10 percent of acrylamide, any remainder of said polar monomer content being selected from the group consisting of acrylonitrile, N-(alkyl)acrylamide, having from 1 to 3 carbon atoms in said alkyl groups, methacrylamide, N-(alkyl)methacrylamide, having from 1 to 3 carbon atoms in said alkyl groups, N-methylol acrylamide, N[2-(2-methyl-4-oxopentyl)]acrylamide, N-(1,1-dimethyl-3-oxobutyl) acrylamide, acrylic acid, methacrylic acid and alkali metal and ammonium salts of acrylic acid, methacrylic, maleic and fumaric acids, itaconic and citraconic acids, half alkyl esters of maleic, fumaric, itaconic, and citraconic acids having from 1 to 6 carbon atoms in said alkyl groups, acrylyl and methacrylyl esters of hydroxyalkanoic acids having from 2 to 6 carbon atoms in said alkanoic acids, acrylylamide and methacrylylamides of aminoalkanoic acids having from 2 to 6 carbon atoms in said aminoalkanoic acid, hydroxyethyl and hydroxypropyl esters of acrylic, methacrylic, maleic, and fumaric acids, vinyl esters of alkanoic acids having from 1 to 6 carbon atoms and alkyl sulfonic acid having from 1 to 6 carbon atoms, phenylsulfonic acids, and acrylyl and methacrylyl esters of hydroxyalkylsulfonic acid having from 1 to 6 carbon atoms in said alkyl moieties, and hydroxyalkylsulfonamides having from 1 to 6 carbon atoms in said hydroxyalkyl moieties; and (b) interpolymers of the type described in (a) treated with an acid or a base having an ionization constant higher than about $10^{-4}$ in amounts equivated to up to about 100 percent of the amide content of said interpolymer.

9. A fibrous substrate in accordance with claim 8 wherein the interpolymer is a terpolymer containing from about 5 to 70 percent ethylene, from about 30 to 95 percent vinyl chloride and from about 0.1 to 10 percent acrylamide.

10. A fibrous substrate in accordance with claim 8 wherein the substrate is coated with about 0.5 to about 150 pounds of the heteropolymer/interpolymer composition on one side per each 3000 square feet of substrate.

11. A fibrous substrate in accordance with claim 8 wherein the substrate is coated with about 1 to about 20 pounds of the heteropolymer/interpolymer composition on one side per each 3000 square feet of substrate.

12. A fibrous substrate in accordance with claim 8 wherein the substrate is coated with about 1 to about 5 pounds of the heteropolymer/interpolymer composition on one side per each 3000 square feet of substrate.

13. A fibrous substrate as described in claim 8 wherein the interpolymer is a terpolymer containing about 19 to 23 percent ethylene, about 74 to 78 percent vinyl chloride, and from about 2 to 4 percent acrylamide in aqueous dispersion treated with sodium hydroxide in an amount stoichiometrically equivalent to about 10 to 100 percent of the amide group content of said terpolymer.

14. A coated fibrous substrate in accordance with claim 8 wherein the substrate is paper.

15. A coated fibrous substrate in accordance with claim 8 wherein the substrate is paperboard.

16. A coated fibrous substrate in accordance with claim 8 wherein the substrate is glassine.

17. A coated fibrous substrate in accordance with claim 8 wherein the substrate is parchment.

References Cited
UNITED STATES PATENTS

| | | | |
|---|---|---|---|
| 2,470,911 | 5/1949 | Baer | 260—78.5 |
| 2,483,959 | 10/1949 | Baer | 260—45.75 |
| 3,005,802 | 10/1961 | Sellers | 260—78.5 |

MURRAY TILLMAN, Primary Examiner

C. J. SECCURO, Assistant Examiner

U.S. Cl. X.R.
260—29.6; 117—155